(12) United States Patent
Barnett

(10) Patent No.: US 6,325,637 B1
(45) Date of Patent: Dec. 4, 2001

(54) CARD READER

(75) Inventor: Ricky Barnett, Tokyo (JP)

(73) Assignee: Nokia Mobile Phone Limited, ESpoo (FI)

( * ) Notice: Subject to any disclaimer, the term of this patent is extended or adjusted under 35 U.S.C. 154(b) by 0 days.

(21) Appl. No.: 09/619,657

(22) Filed: Jul. 19, 2000

(30) Foreign Application Priority Data

Jul. 19, 1999 (GB) .................................................. 9916908

(51) Int. Cl.[7] .................................................. H01R 12/00
(52) U.S. Cl. .................................................. 439/67; 439/86
(58) Field of Search .................... 439/67, 218, 630, 439/86, 71, 91; 361/737

(56) References Cited

U.S. PATENT DOCUMENTS

| | | | | |
|---|---|---|---|---|
| 4,125,310 | * | 11/1978 | Reardon, II et al. .................. | 439/92 |
| 4,891,013 | * | 1/1990 | Komaki .................................. | 439/66 |
| 4,927,368 | * | 5/1990 | Shino ..................................... | 439/66 |
| 5,307,561 | * | 5/1994 | Feigenbaum et al. .................. | 29/846 |
| 5,364,277 | * | 11/1994 | Crumly et al. .......................... | 439/67 |
| 5,899,757 | * | 5/1999 | Neidich et al. ......................... | 439/67 |
| 5,932,047 | * | 8/1999 | Brodsky et al. ..................... | 156/150 |
| 6,050,492 | * | 4/2000 | Hoolhorst ............................ | 235/475 |
| 6,053,748 | * | 4/2000 | Bricaud et al. ..................... | 439/76.1 |
| 6,053,775 | * | 4/2000 | Ungermann .......................... | 439/630 |
| 6,057,638 | * | 5/2000 | Cathey et al. ....................... | 313/311 |
| 6,062,887 | * | 5/2000 | Schuster et al. ...................... | 439/218 |
| 6,075,706 | * | 6/2000 | Learmonth et al. .................. | 361/737 |
| 6,114,221 | * | 9/2000 | Tonti et al. .......................... | 438/455 |
| 6,126,454 | * | 10/2000 | Flegeo ................................... | 439/67 |
| 6,152,744 | * | 11/2000 | Maeda .................................. | 439/71 |
| 6,163,268 | * | 12/2000 | Obata et al. ...................... | 340/693.5 |
| 6,164,984 | * | 12/2000 | Schreiner ............................... | 439/86 |
| 6,171,114 | * | 1/2001 | Gillette et al. ......................... | 439/67 |
| 6,173,405 | * | 1/2001 | Nagel .................................. | 713/200 |

* cited by examiner

Primary Examiner—Tulsidas Patel
(74) Attorney, Agent, or Firm—Antonelli, Terry, Stout & Kraus, LLP

(57) ABSTRACT

A SIM card reader comprising a housing having a recess, having a substantially planar floor portion and wall portions, sized to accommodate and thereby position the SIM card; resilient material within the recess and overlying at least portions of the recess floor; a dielectric substrate within the recess and supported by the resilient material, having an upper surface substantially planar to the floor of the recess and having contact elements extending from the substrate upper surface away from the recess floor wherein each contact element comprises a raised three dimensional metallic structure which extends substantially perpendicularly relative to the substrate upper surface, from a base portion at the substrate upper surface to a free end of reduced area; and means for holding the SIM card within the recess while pressing the SIM card toward the recess floor whereby the resilient material is compressed and physical connection is made between the SIM card and the contact elements.

12 Claims, 2 Drawing Sheets

CARD READER

BACKGROUND OF THE INVENTION

The present invention relates to a card reader and in particular a card reader of reduced dimensions.

Currently one of the drivers in the radio telephone market is phone size and it is desirable to reduce phone size. Over recent years there has been considerable success in reducing the length and width of a radio telephone. Although the depth of radio telephone has been reduced, it has been found that it is more difficult to reduce phone size in this dimension compared to other dimensions. This may result in aesthetically unappealing phone shapes.

Accordingly it would be desirable to reduce the size of a radio telephone along its depth dimension.

A typical radio telephone has a vast number of components. In the smaller radio telephones such as the NOKIA 8810 (Trade Mark) the phone has been carefully optimised to minimise weight and size. The innovation which underlies the present application results in part from the inventor's realisation that the SIM card reader, which is ostensibly optimally designed for space reduction, is one part of the radio telephone in which, with ingenuity, volume could be saved.

FIGS. 1 and 2 illustrate a current SIM card reader 2. The SIM card reader 2 receives a SIM card 50 that has a card substrate 52 on which there is a plurality of separate conductive contact portions 54. The reader 2 has an interconnect 30 each of which connects a contact portion 54 of the SIM card to a radio telephone printed circuit board 10 via a connect 36. The interconnect 30 has a cantilevered portion 34 which is firmly held between an upper substrate 40 and a lower substrate 20 of the card reader 2 and a curved contact portion 32 for connecting with the a contact portion 54 of the SIM card. The lower substrate 20 has a recess 22 position beneath the curved contact portion 32 of the interconnect 30. This recess 22 has a clearance or depth 24. The upper substrate 40 has a catch or clamp 42 which defines an abutting surface 44 which overhangs a parallel restraining portion 46 of the upper substrate 40. The gap between the abutting surface 44 of the catch 42 and the restraining surface is slightly greater than the thickness of a SIM card.

The SIM card 52 is placed into the card reader 2 by lowering the card 52 so that it abuts with the curved contact portion 34 of the interconnect 30 and flexes the interconnect and then sliding the card so that it nestles underneath the abutting surface 44. Releasing the card results in it being held between the upward force provided by the flexed interconnect 30 and the restraining reaction provided by the abutting surface 44. When the card is in position the cantilevered portion 34 of the interconnect is flexed downward and the curved portion 32 moves into the recess 22. The cantilevering of the interconnect 30 between the restraining portion 46 of the upper substrate and the lower substrate allows the resilient interconnect to return to its quiescent position standing proud of the restraining surface 46 when the card is removed. It is important that the SIM card can be easily removed and returned to the reader without any tools.

Further SIM card readers according to the prior art are described in U.S. Pat. No. 5,718,609 and U.S. Pat. No. 5,320,552.

These SIM card readers also use resiliently flexible interconnects to connect to the SIM card. Such interconnects in SIM card readers are reliable and up until now there has been no motivation to adapt them.

The inventor identified that the resiliently flexible interconnect provides the dual function of connecting the SIM card to the PCB and providing a sprung contact holding the SIM card in position. He realized that one feature limiting the reduction of the size of the card reader was that enough room must be provided in the SIM card reader to allow the recess 22 to accept the resilient interconnect when it flexes downwards on inserting the SIM card. The inventor after having successfully identified where volume might be saved additionally realized how this saving may be effected by the novel application of known technology to provide both a low volume and reliable contact.

This known technology includes U.S. Pat. No. 4,125,310, U.S. Pat. No. 5,197,184 and U.S. Pat. No. 5,364,277 which describe replacing the standard friction type connector which connects a flat cable to a circuit with a new type of two-part connector. A plurality of projecting interconnection features is provided on a first part of the connector. These projecting features are pressed against similar features or metallic connecting pads on a second part of the connector to form an electrical connection. The two connector parts are then physically clamped together ensuring the electrical contact between the two circuits. U.S. Pat. No. 5,197,184 and U.S. Pat. No. 5,364,277, in addition, relates to the additive electroforming of the plurality of projecting interconnection features. The circuit has an insulating substrate from which raised copper conductive elements protrude. The surface of the copper conductive elements is covered with gold. The techniques for forming and controlling the shape of the plurality of projecting interconnecting features are developed in U.S. Pat. No. 5,307,561 and U.S. Pat. No. 5,354,205. These documents describe how pyramidal and conical projecting features may be formed. The described connectors are available commercially from Packard-Hughes Interconnect under the trademark of "Gold Dot".

SUMMARY OF THE INVENTION

According to one aspect of the present invention there is provided a card reader comprising:

a housing having a recess, having a substantially planar floor portion and wall portions, sized to accommodate and thereby position the card;

resilient material within the recess and overlying at least portions of the recess floor, a dielectric substrate within the recess and supported by the resilient material, having an upper surface substantially planar to the floor of the recess and from the recess floor wherein each contact element comprises a raised three dimensional metallic structure which extends substantially perpendicularly relative to the substrate upper surface, from a base portion at the substrate upper surface to a free end of reduced area; and means for holding the card within the recess while pressing the card toward the recess floor whereby the resilient material is compressed and physical connection is made between the card and the contact elements.

According to another aspect of the present invention there is provided a radio communications device having a card reader comprising:

a housing having a recess, having a substantially planar floor portion and wall portions, sized to accommodate and thereby position the card;

resilient material within the recess and overlying at least portions of the recess floor;

a dielectric substrate within the recess and supported by the resilient material, having an upper surface substantially planar to the floor of the recess and having contact elements extending from the substrate upper surface away from the recess floor wherein each contact element comprises a raised three dimensional metallic structure which extends substantially perpendicularly relative to the substrate upper surface, from a base portion at the substrate upper surface to a free end of reduced area; and means for holding the card within the recess while pressing the card toward the recess floor whereby the resilient material is compressed and physical connection is made between the card and the contact elements.

The card reader is preferably a SIM card reader but may, for example, be a reader for other smart cards. The radio communications device is preferably a radio telephone but may, for example, be some other wireless device.

The means for holding the SIM card may comprise a clamp by which the SIM card is urged into the recess or an attachable/detachable battery for the radio telephone by which the SIM card is urged into the recess when the battery is attached.

The combined thickness of the SIM card, of the substrate including the extension of the contact elements, and of the resilient material in its quiescent state, preferably exceeds the depth dimension of the recess, whereby holding the SIM card within the recess compresses the resilient the resilient material has elastic properties and dimensions chosen to provide a suitable compressive force between SIM card and contact elements.

Each contact element may taper from the base portion to the free end of reduced area. Furthermore, each contact element may be pointed at its free end to allow penetration of any oxide on the SIM card contacts. Each contact element may be shaped substantially as a pyramid or a cone. At least the is substantially solid copper or solid copper covered at least at the free end by gold.

BRIEF DESCRIPTION OF THE DRAWINGS

For a better understanding of the present invention reference will now be made by way of example only to the accompanying drawings in which.

Detailed Description

Figure 1:
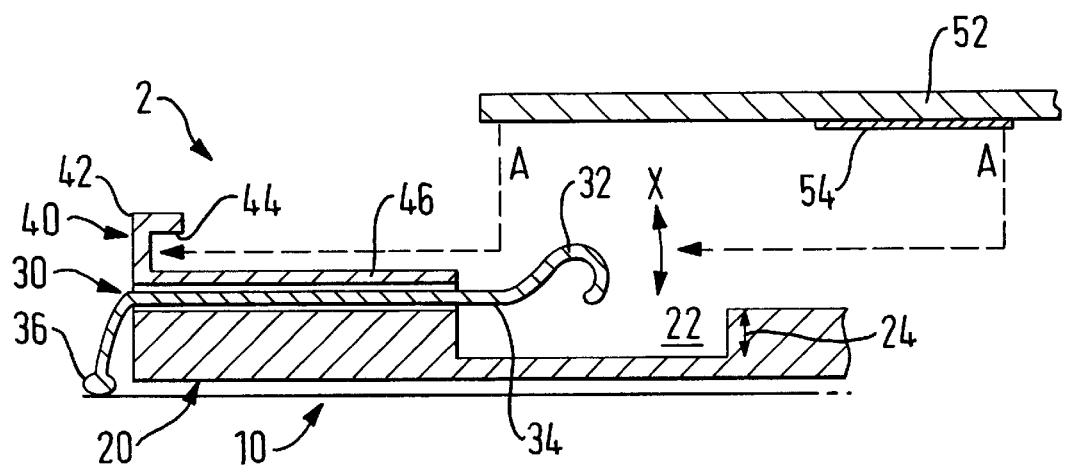
FIGS. 1 and 2 illustrate a current SIM card reader.
Figure 2:
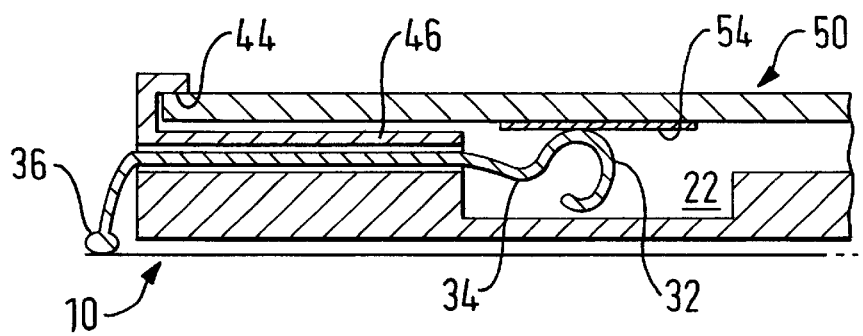
Figure 3:
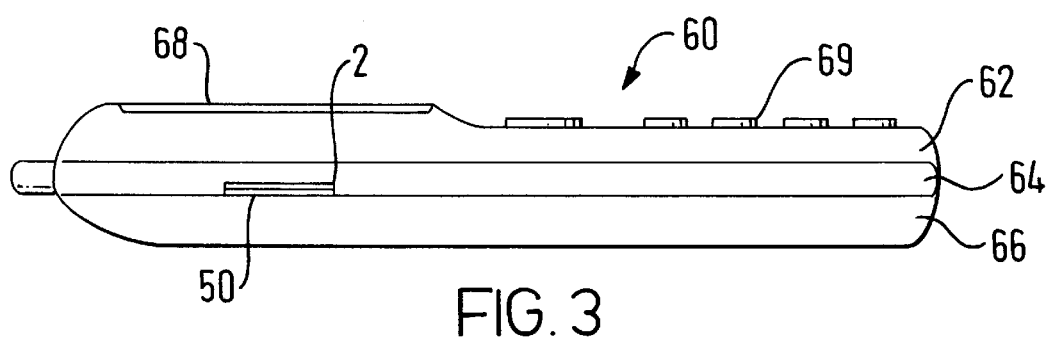
FIG. 3 illustrates a radio telephone.

One example of a radio telephone 60 is illustrated in cross-section in FIG. 3. The phone has a front cover 62 in which a user interface including a display and key pad 69 is defined, a body portion 64 containing the electronics of the phone and a back cover 66 which preferably contains a battery. The body 64 has a SIM card reader 2 containing a SIM card 50. The SIM card reader 2 is accessible on removing the back cover 66 to remove or replace the SIM card 50 but is otherwise inaccessible.

Figure 4:
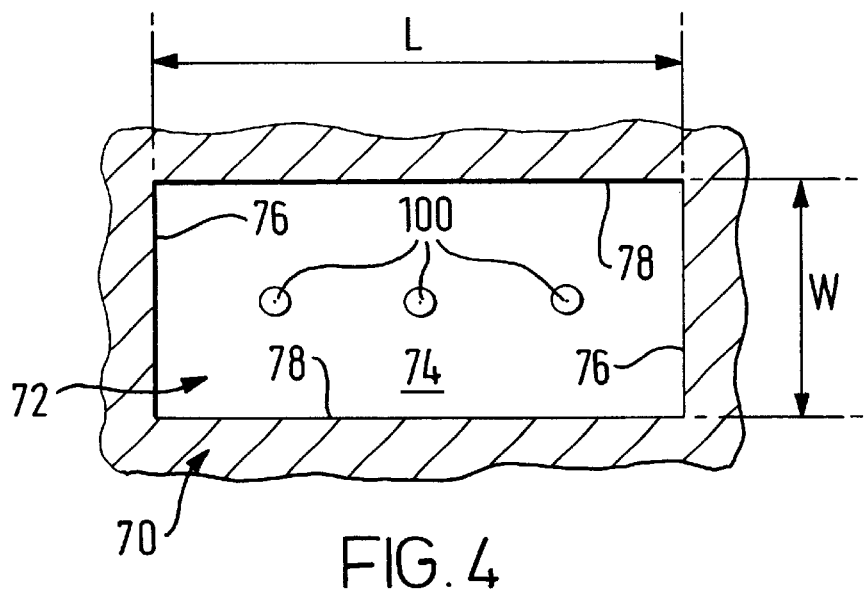
FIGS. 4, illustrates a SIM card reader according to the invention in plan view.
Figure 5:
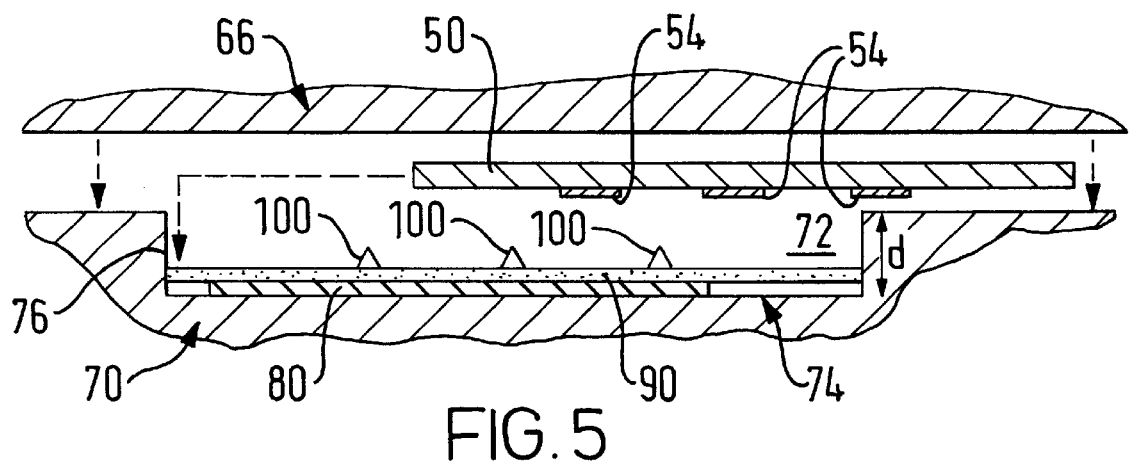
FIGS. 5 and 6 illustrate a SIM card reader according to the invention in cross-sectional view.
Figure 6:
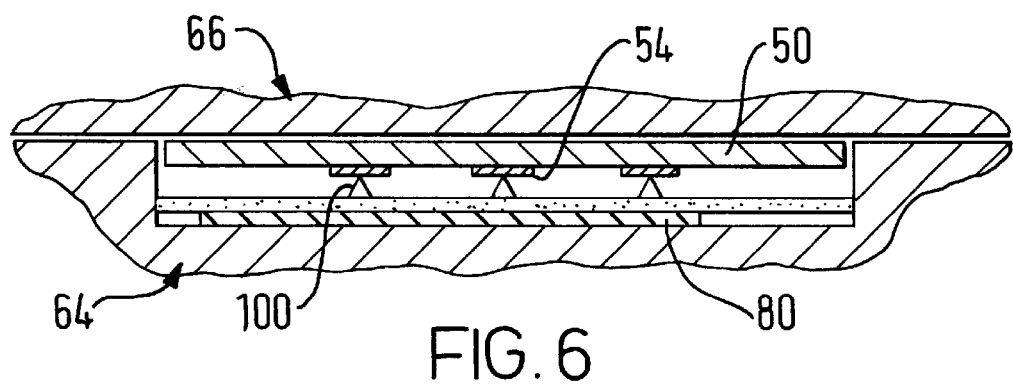

FIGS. 4 and 5 illustrate a first embodiment of the present invention. A card reader 2 has a body or housing 70, which may or may not be an integral part of the phone body 64. The housing 70 has a rectangular recess 72 of a length l, and a width w and a depth d. The recess is defined by a planar floor 74, long parallel side walls 78 of length l and height d which are perpendicular to the floor and shorter parallel side walls 76 of length w and height d which are also perpendicular to the floor. The length l and width w of the recess are very slightly greater than the respective length and width of a SIM card 50, so that the SIM card can be dropped into the recess and fit there snugly. Exposed within the recess are pluralities of contact elements 100, which physically connect to the contact areas 54 on a SIM card when, fitted into the recess. The snug fit of the SIM card to the recess ensures that each of the SIM contacts 54 is positioned over a corresponding contact element 100. When the SIM card is placed in the recess it is held in position by attaching the back cover of the phone as illustrated in FIGS. 5 and 6.

Referring to FIG. 5, a cross-section of the SIM card holder is illustrated. The recess 72 in the housing 70 is defined by its side walls 78 and 76 and the floor 74. A planar layer of elastomeric material extends over the planar floor 74 of the recess 72. A planar substrate 90 of dielectric or insulating material is positioned on top of the elastomer 80 so that the upper surface of the dielectric is substantially parallel to the floor of the recess 72. The substrate 90 has a plurality of contact elements 100 standing proud of the upper surface of the substrate each of which is electrically connected via an interconnect, on or within the substrate 90, to an input/output of the SIM card reader.

Each protruding contact element is metallic and is preferably made of solid copper or solid copper with an overcoat of gold. The elements may have internal voids with are either empty or filled with material. The contact element has a wide base next to the upper surface of the substrate 90 and tapers to a point at a free end. The point can translate a moderate pressure supplied by the elastomer to the substrate in to a large force against the SIM card, he shape and size of the point affects the force. Thus the point of the contact can be dimensioned to penetrate a layer of oxide on the SIM card contact 54.The shape of contact element is preferably substantially pyramidal or conical, so that in cross-section the contact elements have a triangular cross-section. Typically the height of the contact element from base to point is about 0.1 mm and the size of the base is about 0.4 mm.

The summation of the thickness of the elastomer layer 80 in its quiescent state, the thickness of the substrate 90 including the height of the contact elements 100, and the thickness of the SIM card 50 is greater than the depth d of the recess 72. Consequently when the SIM card is placed in the recess 72 it is supported by the contact elements 100 of the substrate 90 such that the SIM card does not lie wholly within the recess 72. However, attaching the back cover 66 to the phone body 64 having the card reader 2 presses the SIM card into the recess and clamps it there. Pressing the SIM card into the recess causes the elastomer layer to be resiliently compressed. The elastomer layer therefore in its compressed state provides a force which urges the contacts 100 of the reader 2 into physical contact with the contact portions 54 of the SIM card 50. The force of this urging may be controlled by selecting/varying the type elastomer material and the depth of the layer of elastomer material 80.

The placement of the SIM card 50 with the recess 72 and the attachment of the back cover are illustrated in FIGS. 5 and 6. The elastomer is in its quiescent state in FIG. 5 and in its compressed state in FIG. 6.

Other embodiments of the invention are possible in which the SIM card is held in place by a drop-and-slide clamping system such in the Nokia 7110 (trademark), or a rotate-and-slide system as in the Nokia 6110 (trademark) or any other suitable system which clamps a SIM card within a recess.

The substrate 90 with the plurality of pointed contact elements 100 is preferably manufactured in accordance with the process described in U.S. Pat. No. 5,307,561 and U.S. Pat. No. 5,354,205 (the contents of which are hereby incorporated by reference). Such substrates are commercially available from Packard-Hughes Interconnect.

What is claimed is:

1. A card reader for reading a card, comprising:
   a housing having a recess, having a substantially planar floor portion and wall portions, sized to accommodate and thereby position the card;
   resilient material within the recess and overlying at least portions of the recess floor;
   a dielectric substrate within the recess and supported by the resilient material, having an upper surface substantially planar to the floor of the recess and having contact elements extending from the substrate upper surface away from the recess floor wherein each contact element includes a raised three dimensional structure which extends substantially perpendicularly relative to the substrate upper surface, from a base portion at the substrate upper surface to a free end of reduced area; and
   means for holding the card within the recess while pressing the card toward the recess floor whereby the resilient material is compressed and p physical connection is made between the card and the contact elements.

2. A card reader as claimed in claim 1, wherein the means for holding the card comprises a clamp by which the card is urged into the recess.

3. A card reader as claimed in claim 1, wherein the combined thickness of the card, of the substrate including the extension of the contact elements, and of the resilient material in its quiescent state, exceeds the depth dimension of the recess, whereby holding the card within the recess compresses the resilient material and urgess the card and contact elements into physical contact.

4. A card reader as claimed in claim 3, wherein the resilient material has elastic properties and dimensions chosen to provide a suitable compressive force between card and contact elements.

5. A card reader as claimed in claim 1, wherein each contact element tapers from the base portion to the free end of reduced area.

6. A card reader as claimed in claim 1, wherein each contact element is pointed at its free end to allow penetration of any oxide on the card contacts.

7. A card reader as claimed in claim 1, wherein each contact element is shaped substantially as a pyramid or a cone.

8. A card reader as claimed in claim 1, wherein at least one surface of each of the contact element is metallic.

9. A card reader or a radio communications device as claimed in claim 1, wherein the contact element comprises copper.

10. A card reader or a radio communications device as claimed in claim 1, wherein the contact element comprises copper covered at least at the free end by gold.

11. A radio communication device having a card reader for reading a card, comprising:
    a housing having a recess, having a substantially planar floor portion an wall portions, sized to accommodate and thereby position the card;
    resilient material within the recess and overlying at least portions of the recess floor;
    a dielectric substrate within the recess and supported by the resilient material, having an upper surface substantially planar to the floor of the recess and having contact elements extending from the substrate upper surface away from the recess floor wherein each contact element comprises a raised three dimensional metallic structure which extends substantially perpendicularly relative to the substrate upper surface, from a base portion at the substrate upper surface to a free end of reduced area; and
    means for holding the card within the recess while pressing the card toward the recess floor whereby the resilient material is compressed and physical connection is made between the card and the contact elements.

12. A radio communications device as claimed in claim 11, wherein the means for holding the card comprises an attachable/detachable battery for the radio communications device by which the card is urged into the recess when the battery is attached.

* * * * *